United States Patent [19]

Mattei et al.

[11] Patent Number: 4,475,220
[45] Date of Patent: Oct. 2, 1984

[54] SYMBOL SYNCHRONIZER FOR MPSK SIGNALS

[75] Inventors: Anthony Mattei, Philadelphia; William L. Hahn, Jr., Glenside, both of Pa.

[73] Assignee: RCA Corporation, New York, N.Y.

[21] Appl. No.: 340,771

[22] Filed: Jan. 19, 1982

[51] Int. Cl.³ .......................... H03D 3/22; H03L 7/06
[52] U.S. Cl. ..................................... 375/86; 375/120; 331/1 A; 307/516
[58] Field of Search .................... 375/86, 119, 120; 307/510, 514, 516, 518; 331/1 A, 4, DIG. 2, DIG. 3; 361/51; 328/59, 60, 63, 66, 72, 179; 329/110, 122, 124, 104, 107

[56] References Cited

U.S. PATENT DOCUMENTS

| | | | |
|---|---|---|---|
| 3,521,173 | 7/1970 | Farley | 307/514 |
| 4,080,576 | 3/1978 | Huber et al. | 328/72 |
| 4,234,957 | 11/1980 | Tracey et al. | 375/86 |
| 4,374,438 | 2/1983 | Crowley | 331/1 A |

Primary Examiner—Benedict V. Safourek
Attorney, Agent, or Firm—Joseph S. Tripoli; George E. Haas; Allen L. Limberg

[57] ABSTRACT

A symbol synchronizer, as for use with apparatus for detecting MPSK signals to provide complex sampled data descriptive of keying signal phase, in which the timing of the resampling can be controlled with resolution that is a fraction of the time between successive complex data samples.

The symbol synchronizer uses a first digital controlled oscillator to recover the MPSK baseband signal sampled at a frequency $f_i$ rate. The MPSK signal is operated on to recover a sampled data description of the envelope of the MPSK signal sampled at a frequency $f_s$, which may equal $f_i$ or be down-sampled therefrom. This is digitally filtered to provide a sampled data locking signal to a second digital controlled oscillator, which uses modular arithmetic to generate a digital sampled data description at $f_s$ rate of a sawtooth waveform repetitive at $f_k$ keying rate. In this second digital-controlled oscillator an adder sums its output as delayed by a full $f_s$ clock cycle, the error signal, and a constant term. The output of this adder (ignoring the overflow, to implement the modular arithmetic) is the sawtooth waveform with $f_k$ fundamental frequency subsequently used in the symbol synchronizer. The sawtooth waveform in sampled data form is adapted for digital phase shifting by linearly combining it with a programmable phase correction signal in sampled data form. The shifted waveform is used as the carrier signal for resampling the MPSK signal to provide complex samples, phased locked to $f_k$ keying rate, for application to the circuitry for deciding the keying phase of the received MPSK signal.

4 Claims, 8 Drawing Figures

SYMBOL SYNCHRONIZER FOR MPSK SIGNALS

The Government has rights in this invention pursuant to Contract No. MDA904-77-C-0432 awarded by the Department of Army.

The invention relates to symbol synchronizers, as for use with apparatus for detecting multiple phase shift keying (MPSK) signals, and, more particularly, to symbol synchronizers in which the timing of resampling can be more accurately controlled.

MPSK signals may be used in a variety of digital communications systems—e.g., in radio communications and telecommunications systems for digital data. In MPSK systems the detection apparatus receives a carrier of constant frequency $f_c$ which is modulated at intervals of a keying frequency $f_k$ with a phase $\phi = 2(i-1)\pi/N$, where i is selected from one to N during each keying interval dependent on the modulating function, and where N is the number of possible keying phases. Biphase (N=2) and quadriphase (N=4) systems are commonly used, the former being usually referred to simply as "phase shift keying" or "PSK". The digital information can be coded according to the difference in phasing between successive keying intervals, so a reference carrier need not be transmitted along with the MPSK signals.

Supposing reference phases for $f_c$ and $f_k$ are not known at the MPSK detection apparatus, a common practice is to phase-lock a first local oscillator generating oscillations at $f_c$ rate or a multiple thereof to a harmonic of the MPSK signal, so its phasing is essentially unaffected by the MPSK phase modulation. In-phase and quadrature phases of regenerated carrier are used in a synchrodyning process to synchronously detect the MPSK signal for generating real and imaginary samples of the detected signal. These samples are supplied to the symbol synchronizer, to be resampled dependent upon the phase of a second local oscillator generating oscillations at $f_k$ rate, which are phase-locked to phase-shift-keying transitions. This resampling is done to provide final MPSK signal samples which better define phase transitions, reducing the probability of error in determining the phase keying transition, if any, that has most recently occurred at any given time. ("Synchrodyning" is the process of heterodyning a signal with a carrier synchronized with its own carrier.)

Information for phase-locking the second local oscillator is customarily obtained by taking advantage of the fact that the envelope of the MPSK signal, when the signal has been bandwidth-limited, exhibits a reduction in its amplitude when there is a change from one phase to another during the phase-shift-keying process. These reductions recur on multiples of the keying inverval, and thus can be synchronously detected together with the output of the second local oscillator at $f_k$ frequency, for generating the error signal used to phase-lock the second local oscillator to the $f_k$ keying frequency of the received MPSK signal. This forms a phase-locked loop (PLL) of a type called "second order" since it strives to eliminate errors in the second derivative of phase keying with respect to the variable time.

It is necessary in MPSK detection apparatus using primarily digital electronics, rather than analog electronics, to operate on a sampled-data rather than continuous basis. A sampling frequency $f_i$ high enough to meet the Nyquist Criterion is used when providing sampled-data descriptions of the MPSK signal and of oscillations from the first local oscillator to be multiplied together in deriving complex samples of the MPSK signal. A sampling frequency $f_s$, which need not be the same as $f_i$ and need not be harmonic with $f_c$ or $f_k$, but is P/Q times $f_i$, where P and Q are positive integers, is used thereafter. P/Q is customarily chosen to be substantially less than unity to reduce sampling rate, but $f_s$ must sample the complex samples at a rate at least twice $f_k$ to satisfy the Nyquist Criterion for distinguishing the keying phases without ambiguity. Each of the first and second local oscillators in such MPSK detection apparatus is customarily a digitally controlled oscillator or "DCO".

In prior art MPSK detection apparatus using a DCO as the second local oscillator, the phase of oscillations generated by the second local oscillator has been capable of being adjusted in only a discontinuous manner to discrete phases coarsely separated by intervals determined by the sampling frequency $f_s$. However, the inventors have found that probability of error in deciding the phasing of the MPSK signal following symbol synchronization can be reduced still further if the intervals between discrete phases can be structured to provide a closer approximation to continuous adjustment of second local oscillator phasing, thus to allow optimization of the symbol synchronization process.

The present invention in a primary one of its aspects is embodied in a phase-locked digitally-controlled oscillator arrangement wherein there is provision for substantially continuous adjustment of output signal phase. The DCO generates successive digital numbers as samples of a triangular waveform used in the phase discrimination associated with its phase-locking loop. These numbers are incremented or decremented by other binary numbers to provide an output signal with electrically controlled phase shift.

Figure 1:
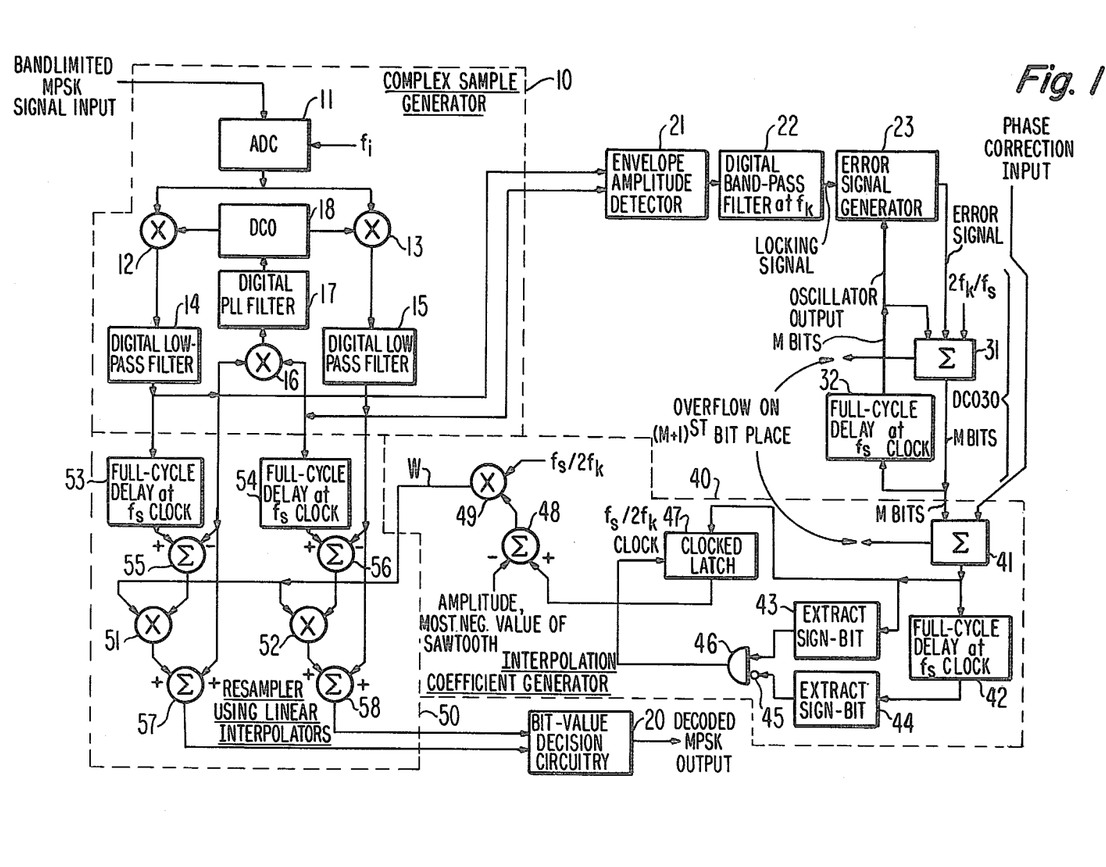
FIG. 1 is an overall block schematic of a MPSK detection apparatus including a symbol synchronizer embodying the present invention.

In the FIG. 1 MPSK signal detection apparatus, the circuitry exclusive of circuitry 10 for generating complex samples of the MPSK signal (shown in dashed outline at upper left) and circuitry 20 for deciding on bit values constitutes the improved symbol synchronizer embodying the invention. In circuitry 10 the band-limited MPSK signal is received as analog input signal by an analog-to-digital converter (ADC), 11, which samples at $f_i=(Q/P)f_s$ rate. The digitized response of ADC 11 to the band-limited MPSK signal is then synchronously detected by multiplying in digital multipliers 12 and 13 the response with in-phase and quadrature phases of $f_c$ supplied in sampled data form at $f_i=(Q/P)f_s$ sampling rate, respectively. The products from multipliers 12 and 13 are applied to the inputs of digital low-pass filters 14 and 15, respectively. The present invention facilitates output signals from filters 14 and 15 being subsequently sampled at an $f_s$ substantially lower than $f_i$, rather than equal to $f_i$, in order to reduce the number of arithmetic operations in subsequent signal processing. This is because the phase of resampling complex data samples, when interpolating between successive ones of them, can be controlled to fractions of the sampling rate $f_s$. In any case, the sampling rate for the remainder of the system after filters 14 and 15 is denominated "$f_s$".

The output signal of low-pass filter 14 is a stream of real sample voltages, R(t), of the digitized MPSK signal; and the output signal of low-pass filter 15 is a stream of imaginary sample voltages I(t), of the digitized MPSK signal. R(t) and I(t) together describe a complex sample voltage $v(t)=R(t)+jI(t)$, t being quantized time values interspaced by sampling invervals equal to a cycle of $f_s$. The low-pass filters 14 and 15 suppress noise and aliases at frequencies above the modulating signal bandwidth including $f_k$ and its significant harmonics and contribute to the bandlimiting which introduces variation into the amplitude of the envelope of the complex sample voltage v(t).

Regenerated carrier frequency $f_c$ can be automatically frequency and phase locked (AFPC'd) to a harmonic of the carrier of the MPSK signal to suppress phase variations attributable to low-frequency noise (i.e. as arises from Doppler shift or variable multipath reception in a radio link); and a representative way of doing this in a biphase PSK system, which way involves a Costas loop, is shown in FIG. 1. R(t) and I(t) are multiplied together in a digital multiplier 16. The resulting product is applied to the input of the Costas loop digital filter 17 to develop the digital AFPC signal to control automatically the frequency and phase of the DCO 18 used as first local oscillator supplying regenerated $f_c$ for synchrodyning the digitized band-limited MPSK signal. Where polyphase MPSK is used more complex Costas loops can be used to synchronize DCO 18. Such loops are described in Chapter 2 of *Telecommunication Systems Engineering* by Lindsey & Simon published by Prentice Hall, Inc., Englewood Cliffs, NJ, copyright 1973.

DCO 18 is of a type supplying sampled-data descriptions at $f_i$ rate of in-phase and quadrature phases of regenerated $f_c$. If $f_i$ is many times as high as $f_c$, it is convenient to accumulate a constant at $f_i$ rate in two's complement arithmetic using a non-saturating adder to generate an in-phase serrasoid (or sawtooth) waveform at $f_c$ repetition rate. Error signal from the loop filter 17 may be admitted into the accumulation to AFPC the serrasoid. The serrasoid is used to describe the gamut of phase angles of cosine and sine functions looked up from read only memory and applied as regenerated $f_c$ carrier inputs to multipliers 12 and 13. Techniques are available for reducing the size of the ROM required for table look-up of cosine and sine functions. Addition of one half the peak-to-peak amplitude of the serrasoid to each sample of the in-phase serrasoid generates samples of a quadrature-phase serrasoid, so the cosine and sine functions can be looked up from the same table. The size of the table can be further reduced by taking advantage of the quadrantal or octantal symmetry of the cosine or sine function.

Using the Costas loop with symbol synchronizers for bi-phase PSK, as embody the invention, is attractive because it entails generating the complex samples v(t) in order to lock to the MPSK signal, which complex samples must be generated in any case for symbol synchronization. Where quadri-phase MPSK is used, rather than using a four-phase Costas loop, it is convenient to multiply R(t) by hard-limited I(t), to multiply I(t) by hard-limited R(t), and to differentially combine the products to supply error signal to the input of digital PLL filter 17. The oscillator for generating $f_c$ may alternatively be synchronized using AFPC signals developed by signal-squaring or by decision-feedback loop. The oscillator may also be a stable beat frequency oscillator with initial phasing determined from an eye pattern or by a preliminary known code sequence. The complex sample voltage v(t) may be generated alternatively, by synchrodyning the MPSK signal and its Hilbert transform with the same phasing of regenerated $f_c$ to obtain R(t) and I(t), respectively.

Since the MPSK signal phasing is not known at the detection apparatus, and since the AFPC'ing of the oscillator used for generating $f_s$ is done so as to disregard phase changes due to the phase shift keying encoding the digital modulation function, a symbol synchronizer must be used to re-sample the complex sample v(t) at phase-shift-keying frequency $f_k$ rate. Ascertaining the time when a keying phase transition is made can be done by noting the variation during such time of the amplitude of the envelope of the MPSK owing to the MPSK signal having been band-limited. Oscillations from a controlled oscillator connected in a phase-lock loop PLL of the second order can be synchronized with these variations in envelope magnitude. Such oscillations can then be adjusted in phase to provide the timing necessary for resampling v(t).

Envelope amplitude detector 21 is used in the FIG. 1 symbol synchronizer to respond to the simultaneous reduction of R(t) and I(t) that occurs during MPSK signal envelope being reduced. Detector 21 may, in accordance with prior art practice, comprise a read-only memory (ROM) addressed responsive to R(t) and I(t) to supply $R(t)^2+I(t)^2$ as locking signal for a PLL. However, alternatively, detector 21 may be apparatus responding to R(t) and I(t) to supply the larger of $|R(t)|+|I(t)|/m$ and $|I(t)|+|R(t)|/m$, m being a positive real number. Or detector 21 may be of a type simply supplying the larger of $|R(t)|$ and $|I(t)|$ as its output. Or it may be of a type simply supplying the sum of $|R(t)|$ and $|I(t)|$. In any case, detector 21 output is applied to the input of a digital band-pass filter 22 centered on $f_k$, which filter suppresses in its output baseband, harmonics of $f_k$ other than the first, and their modulation sidebands.

The output signal from filter 22 is a locking signal supplied to an input of error signal generator 23 receiving as its other input output signal from a digitally controlled oscillator (DCO) 30 and supplying at its output an error signal to digitally control the phase of DCO 30. That is, error signal generator 23 and DCO 30 are connected to form a phase-lock loop. DCO 30 is an accumulator which comprises a digital summation network 31 and a full cycle of clocked delay 32 at frequency $f_s$ for storing oscillator output. On each pulse of $f_s$ clock the output of clocked delay 32 is linearly combined in summation network 31 with a fixed increment and error signal from generator 23. This fixed increment has the value $+2f_k/f_s$ when the output of DCO 30 is defined in two's complement arithmetic, so overflow occurs in digital delay 32 at intervals occurring at $f_k$ frequency. Summation network 31 can be realized by a tree of three non-saturating, two's-complement-arithmetic, M-bit-place, parallel adders, for example.

DCO 30 output is supplied to a linear interpolation coefficient generator 40 generating a linear interpolation coefficient depending on the phase slippage between sampling according to $f_s$ and optimum sampling insofar as resolving phase shift keying transitions is concerned. This linear interpolation coefficient, to be identified as w, is supplied to a resampler 50 using a pair of linear interpolators to interpolate linearly between successive complex samples v(t) and v(t+1) for generating real and imaginary components of corrected samples to be supplied to bit-value decision circuitry 20.

Figure 6:
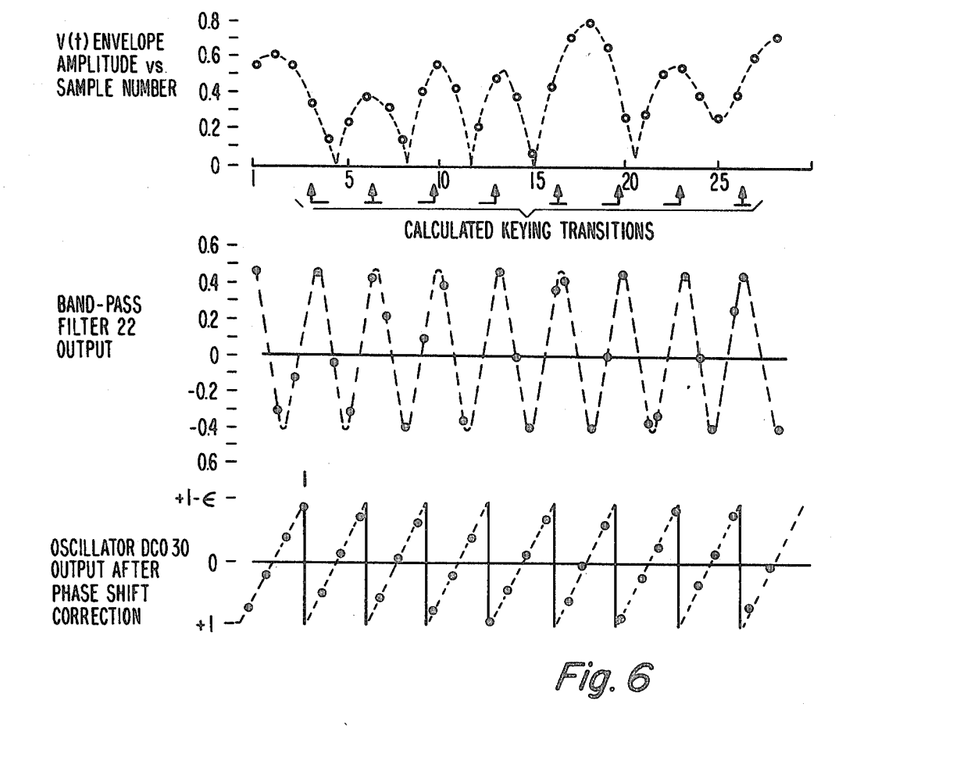
FIG. 6 is a timing diagram showing typical waveforms in the symbol synchronizer of FIGS. 1 and 2, plotted against the same horizontal, time axis.

DCO 30 output from clocked delay 32 would provide a sampled-data description of an ever-ascending ramp if delay 32 had an infinite length in bits of output. However, the number M of bit places in delay 32 output is restricted by limitations imposed by need for practical hardware, so that it will overflow periodically. By designing DCO 30 so it increments the ramp value of $2f_k/f_s$ each cycle of $f_s$, the overflow in digital delay 32 occurs with a periodicity equal to one cycle of $f_k$, it being presumed that the approximate value of $f_k$ is known at the MPSK detection apparatus. That is, delay 32, which may be a parallel register clocked at $f_s$, will then have range of $f_k$ before wrap-around occurs because of the overflow being discarded. The result of the delay 32 overflow on an (M+1)st more significant bit being discarded is that its output is a sampled-data description of a serrasoidal or sawtooth waveform of the same periodicity as $f_k$, as shown at the top of the timing diagram in FIG. 6. FIG. 6 corresponds with DCO 30 output being modulo $2^M$ two's complement in form, which is a convenient numbering system to use in connection with standard digital hardware. Any other cyclical numbering system could be used instead.

The sampled-data description of a sawtooth provided at DCO 30 output is suitable for being phase-compared against filter 22 output in error signal generator 23 to obtain error signal for DCO 30. This phase comparison can be done with digital multipliers using multiple-bit arithmetic as in prior art DCO's, but an improved method will be described later in this specification in connection with description of FIGS. 3 and 4.

A sampled-data description of a phase-shifted sawtooth can be obtained from a sampled-data description of an original sawtooth by linearly combining it with an offset term in a non-saturating adder 41 which supplies an output, from which is discarded overflow of bit places more significant than the most significant place of the sampled-data description of sawtooth supplied as input. This offset term is a programmable phase correction signal; and its programmed value can be supplied by an operator having knowledge concerning an appropriate value for the data transmission link over which the data is being transmitted or can be developed automatically responsive to measurement of data received over the link. Phase is advanced when the linear combining is additive in nature or retarded when the linear combining is subtractive in nature. The resolution of the incrementing or decrementing of $f_k$ phase is $2\pi$ radians divided by $2^M$, where M is the number of bit places in the outputs of delay 32 and the adder in summation circuit 41.

The problem remaining in realizing the symbol synchronizer is relating the degree of $f_k$ phase shift, developed responsive to phase correction input being linearly combined with the sampled-data description of sawtooth, to the phase shift of resampling (considered as a phasor in $f_k$) in resampler 50, which should be in like degree. The nature of the linear interpolator for interpolating between a component of v(t) and v(t+1) in resampler 50 affects the nature of this interface. Linear interpolation between R(t) and R(t+1) or between I(t) and I(t+1) could be carried forward by multiplying them by w and 1−w, respectively, where w is a weighting function or interpolation coefficient which is a positive real number in the open set between zero and unity boundaries. This would require four digital multipliers for linear interpolation, two for multiplying the real portions of the successive samples and two for multiplying the imaginary portions.

FIG. 1 shows a preferred method of linear interpolation requiring only two digital multipliers 51, 52. R(t−1) and I(t−1) samples from complex sample generator 10 are delayed a full cycle of $f_s$ clock frequency in clocked delay circuits 53 and 54, respectively, and then summed with the negatives of the succeeding R(t) and I(t) samples in summation circuits 55 and 56, respectively. The resulting differences R(t−1)−R(t) and I(t−1)−I(t) are supplied from the outputs of circuits 55 and 56 as inputs to multipliers 51 and 52, each to be multiplied by w. The resulting products [R(t−1)−R(t)]w and [I(t−1)−I(t)]w are added back to R(t) and I(t), respectively, in summation circuits 57 and 58 to provide outputs R(t−w) and I(t−w) to bit-value decision circuitry 20. Circuitry 20 in a quadriphase MPSK detector could be provided simply by the extraction of the sign bits in the outputs of summation circuits 57 and 58. In a bi-phase PSK system where the linear interpolator comprising elements 52, 54, 56, 58 is dispensed with, circuitry 20 could be provided simply by the extraction of the sign bit from summation circuit 57.

In more sophisticated designs adaptive equalizers are included to compensate for amplitude distortion and non-linear phase distortion in the transmission link. Such equalizers may weight and sum outputs from multiply-tapped delay lines for R(t−w) and I(t−w), with weights determined according to the particular transmission link being used, to eliminate the amplitude distortion and non-linear phase distortion from R(t−w) and I(t−w) before decision as to the transmitted keying phase.

The interpolation coefficient w is determined proceeding from the departure, as measured from the median value of the shallow slope portions of the phase-shifted sawtooth as provided from summation circuit 41, of the samples occurring immediately after the discontinuities between those shallow slope portions. Each of these samples has subtracted from it in summation circuit 48 the amplitude of the most negative point in the sawtooth waveform, and the result is multiplied by $f_s/2f_k$ to obtain the value of w for that sampling interval and the following ones for minimum keying interval $1/f_k$. As noted above, modulo $2^M$ two's complement arithmetic is convenient to use in a DCO 30 and the summation circuit 41, so the linear combining of both positive and negative numbers can be carried forward in summation circuits 31 and 41 which are simply adders;

also, the number system is cyclical, facilitating the generation of sampled-data descriptions of sawtooth waveform by iterative adding. Assuming a substantial number of bits in the two's complement numbers, the median value of the shallow slope of the sampled sawtooth is essentially zero—i.e., an M-bit-place binary number with every place a ZERO. So the samples from the output of summation circuit 41 to be selected for calculating w will be the samples at or next after negative-going zero crossings. The samples will be negative two's complement numbers. The most negative two's complement number of M bit places is subtracted from the samples to supply the input to multiplier 49 to be multiplied by its other input, $f_s/2f_k$.

FIG. 1 shows this sample selection circuitry as it may be realized for two's complement arithmetic. The selected samples from the output of summation circuit 41 being negative will have a ONE most significant bit, while the concurrent samples of the output of summation circuit 41 as delayed by one clock cycle of $f_s$ in delay circuit 42 still being positive will have a ZERO most significant bit. These most significant bits are extracted by extract sign connections 43 and 44, respectively, and the latter is inverted in logical inverter 45. The most significant bit from summation circuit 41 output and the most significant bit of that output as delayed by delay circuit 42 and inverted by inverter 45 and AND'ed in an AND gate 46 to determine when the first sample at $f_s$ rate is supplied after zero crossing of the sampled-data description of sawtooth wave from summation circuit 41 output. AND gate 46 output goes to ONE on this condition providing a phase-adjusted clock at $f_s/2f_k$ frequency that clocks the sample into a latch circuit 47. Summation circuit 48 determines the difference between the minimum value of the sawtooth waveform and sawtooth sample next after negative-going average-axis sample is perforce negative; and in two's complement arithmetic the subtraction can be performed simply by discarding the most significant bit, a ONE from these samples. In any case the remaining bits of the result multiplied by $f_s/2f_k$ in multiplier 49 to derive w. Since $f_s/2f_k$ is a constant, realizing multiplier 49 by a ROM look-up table is economic when the multiplication has to be done at high rate. Alternatively, multiplier 49 may be a digital multiplier. One may also contrive to have $f_s/2f_k$ be an integral power of two, so multiplier 49 can simply comprise a bit-place shift.

Figure 2:
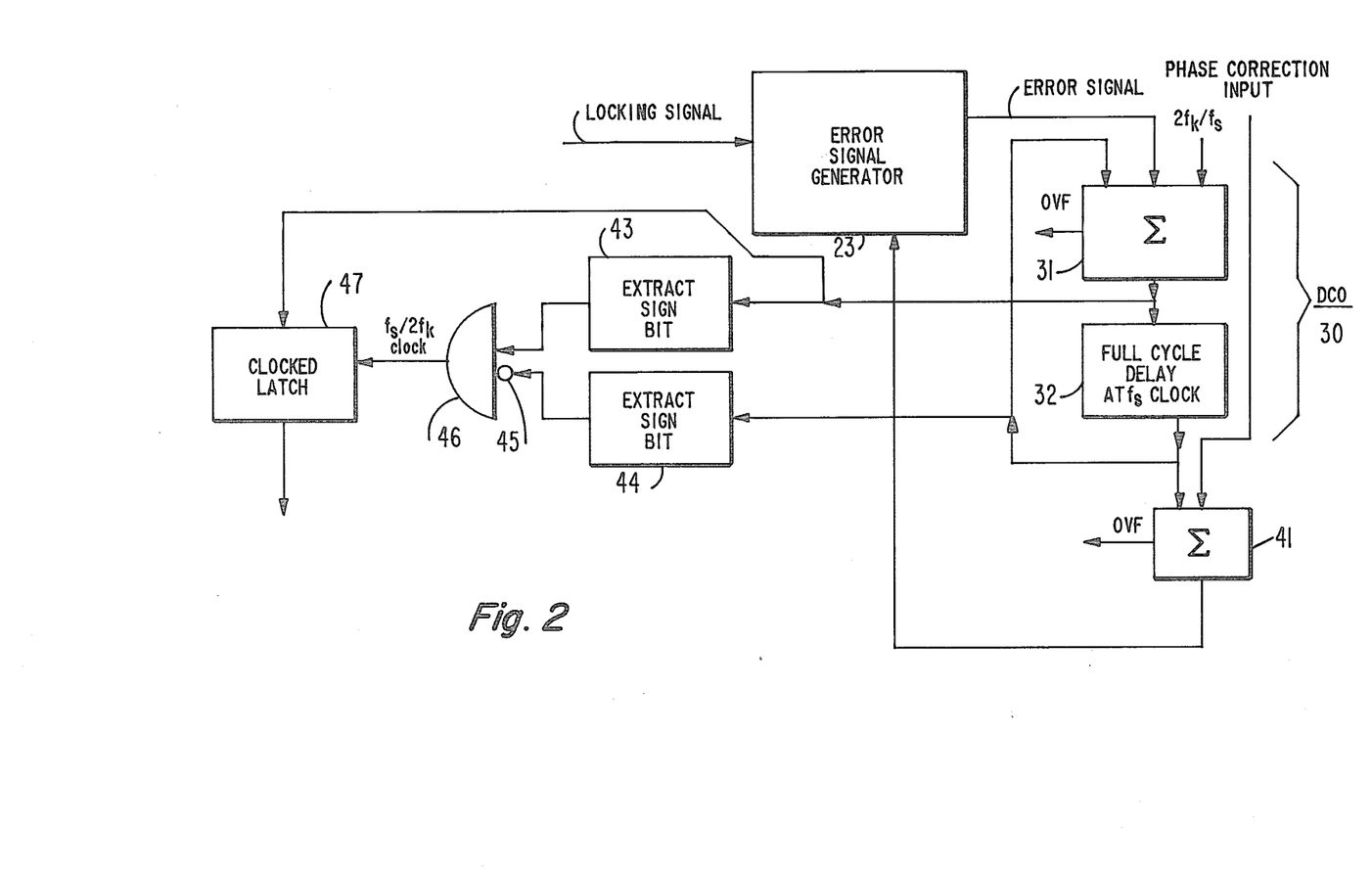
FIG. 2 is a block schematic of a modification that can be made to the FIG. 1 symbol synchronizer in a further embodiment of the invention.
Figure 3:
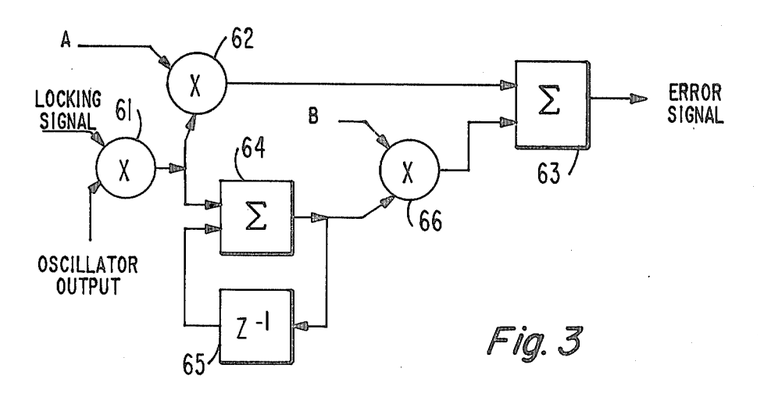
FIGS. 3, 4 and 5 are each a block schematic showing in detail a portion of the phase locked loop in a symbol synchronizer.
Figure 4:
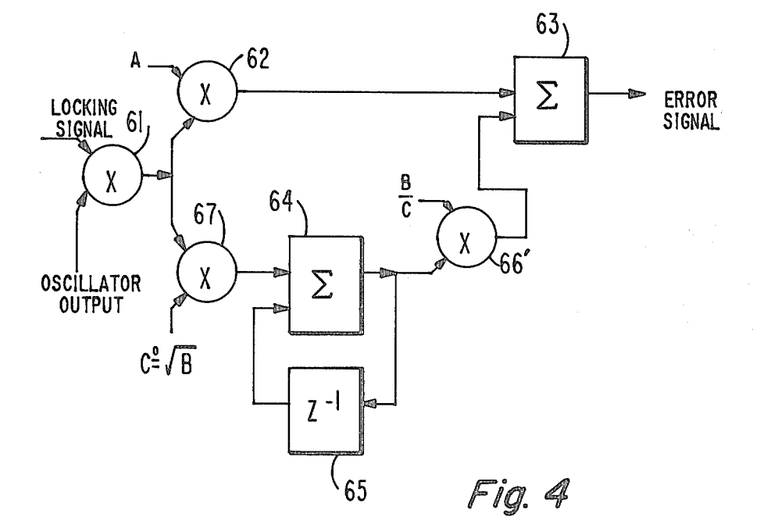

The rearrangement of FIG. 1 components shown in FIG. 2 allows the elimination of clocked delay circuit 42, with the functions of the DCO 30 and of the interpolation coefficient generator being less distinct from each other. FIGS. 3 and 4 show alternative configurations for error signal generator 23.

FIG. 3 shows a multiplier 61 followed in cascade by a digital filter of conventional design. Locking signal from filter 22 and oscillator output from DCO 30 (or from summation circuit 41 when the FIG. 2 modification to FIG. 1 is used) are multiplied together in a multiplier 61. The multiplier 61 output is multiplied by a scaling factor A in a further multiplier 62 and summed with an integral of multiplier 61 output in a summation circuit 63 to generate the error signal output of error signal generator 23. An integral of multiplier 61 output is developed at the output of a summation circuit 64 responsive to multiplier 61 output being applied to one of its inputs and to its output, as delayed by one cycle of $f_s$ clock in a clocked delay circuit 65, being applied to the other of its inputs. This integral is then scaled for summation in summation circuit 63 by multiplying it by a scaling factor B in a multiplier 66. The portion of the error signal provided for by the integrated and scaled multiplier 61 output is used for holding phase lock when the PLL is furnished no new phase error information; and the portion provided for by simply scaling multiplier 61 output provides for speed of response to phase change.

The problems with the error signal generator 23 being realized as shown in FIG. 3 are that the amount of digital multiplication involved tends to be excessive and that the scaling factors A and B are such as to cause a dynamic range problem in the PLL. The dynamic range problem arises because in typical applications A is on the order of $10^{-2}$ and B is on the order of $10^{-5}$, so the FIG. 3 implementation of error signal generator 23 requires double-precision in arithmetic, as compared to the FIG. 4 alternative to be described. (This double-precision requirement is not eased by simply reversing the order of integration and of multiplication by B.)

FIG. 4 shows a double-scaling technique that allows the use of single-precision arithmetic. Output from multiplier 61 is pre-scaled prior to integration by elements 64, 65 by multiplying it by a scaling factor C which approximates $B^{(\frac{1}{2})}$; and multiplication of the integrator output in multiplier 66' is by the factor B/C. Multiplication in multipliers 66' and 67 is single-precision. The FIG. 4 error signal generator can form the basis for a number of hardware reductions. As a first example of such reduction, where C can with minor adjustment be made equal to A, multiplier 67 can be dispensed with and the output of multiplier 62 can be forwarded to integrator elements 64, 65 rather the output of the dispensed-with multiplier 67. The multiplication by A, where not susceptible to being implemented by a simple bit-place shift, can then (if multiplier 61 is a digital multiplier with some precision) be carried forward by parallel accumulation in the DCO to develop DCO output multiplied by A as input to multiplier 61. As a second example of such hardware reduction, when B/C can with minor adjustment be made equal to A, multipliers 62 and 66 can be replaced by direct connections of multiplier 61 output and integrated output from elements 64, 65 to summation circuit 63, with summation circuit 63 output then being multiplied by A to obtain error signal.

Figure 5:
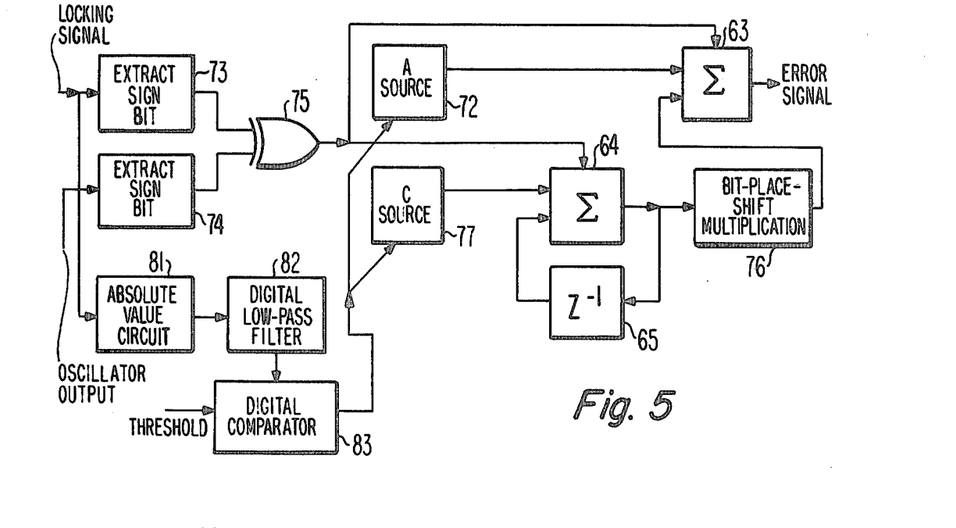

FIG. 5 shows the error signal generator developed by hardware reduction based on FIG. 4 finally used by the inventors in their design of an MPSK detector. Multiplier 61, having a plurality of bit places in multiplicand and multiplier inputs and in its product output, is to be replaced with a multiplier that operates with only single-bit resolution in its inputs and its output. Such a multiplier is realized in FIG. 5 by circuits 73 and 74, which extract the respective sign bits from the locking signal and from the oscillator output (from the output of summation circuit 41 where the FIG. 2 modification is used), and an exclusive-OR gate 75 supplied those sign bits as inputs. The single-bit output from the output of XOR gate 75 can multiply with the scaling factors A and C supplied as binary numbers from sources 72 and 77 respectively, by simply using it to determine whether A is added or subtracted in summation circuit 63 and whether C is added or subtracted in summation circuit 64, thus realizing the multipliers 62 and 67 in simplified form. Finally, multiplier 66' is realized by simple bit-place shift and sign bit extension in connection 76. The order of bit-place shift connection and the integrator in their cascade can be opposite that shown in FIG. 5 without any penalty in the ease of realizing the hardware.

During loss of synchronization of FIG. 1 DCO 18 with an MPSK carrier it is desirable to replace both A and C with zero, so the FIG. 1 DCO 30 continues at the last good estimate of frequency and phase. This feature is beneficial in situations where the effects of noise bursts, rapid fades or other transient phenomena upon the complex samples v(t) would otherwise corrupt the PLL frequency and phase estimates, such corruption delaying re-acquisition of frequency and phase lock when the signal quality improves again. To implement this feature in the FIG. 5 circuitry, the locking signal from band-pass filter 22 of FIG. 1 has its absolute value taken in circuit 81. Presuming the locking signal to be expressed in two's complement arithmetic, circuit 81 can provide a good approximation to the absolute value by exclusive ORing of the sign bit with each other of its bits to pass the amplitudes of positive numbers unchanged and to generate the one's complements of the amplitude bits of negative numbers. The absolute value of the locking signal, or its approximation, is applied to a digital low-pass filter 82. The filtered result is then compared to a threshold value in a digital comparator 83; and, if it is less than that threshold value, A and C are altered to zero. Sources 72 and 77 of A and C may, for example, comprise tri-state multiplexers for selecting between zero and other values of A and C, dependent on control signal supplied from comparator 83.

FIG. 6 is a timing diagram showing typical waveforms in the FIG. 1 symbol synchronizer. The topmost waveform is the amplitude of the envelope of the complex sampling $v(t) = R(t) + jI(t)$ for twenty-eight consecutive samples, shown as heavy dots. The horizontal axis is graduated in sample numbers, and the timing of keying transition times in the PSK signal as determined by the phase-locked loop connection of the local keying oscillator 30 is indicated by the arrows below this axis. The middle waveform shows as heavy dots the succession of samples from the output of band-pass filter 22 which are on a locus of $f_k$ variation. The lowermost waveform is the phase-shifted serrasoid locus of the samples (shown as heavy dots) supplied at the output of summation circuit 41. $\epsilon$ is the value, $2^{-(M-1)}$ of the least significant bit in DCO 30 output supposing it to be expressed in the binary-fractional two's complement arithmetic system. Adding a positive number to these samples in summation circuit 41 will advance the phase of the sawtooth, and adding a negative number will retard it. Notice that the positive-to-negative transitions of sawtooth corresponds to the arrows indicating the calculated keying transition times.

Figure 7:
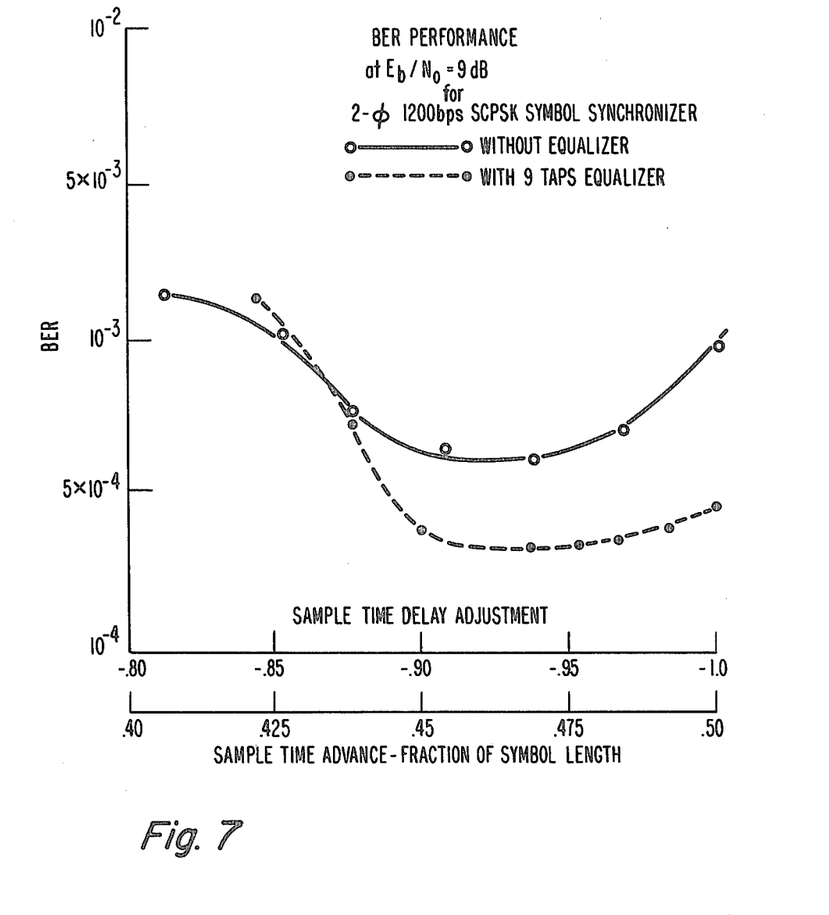
FIG. 7 is a graph showing the bit error rate (BER) reduction provided by the invention for single-channel 2-phase 1200 baud PSK.
Figure 8:
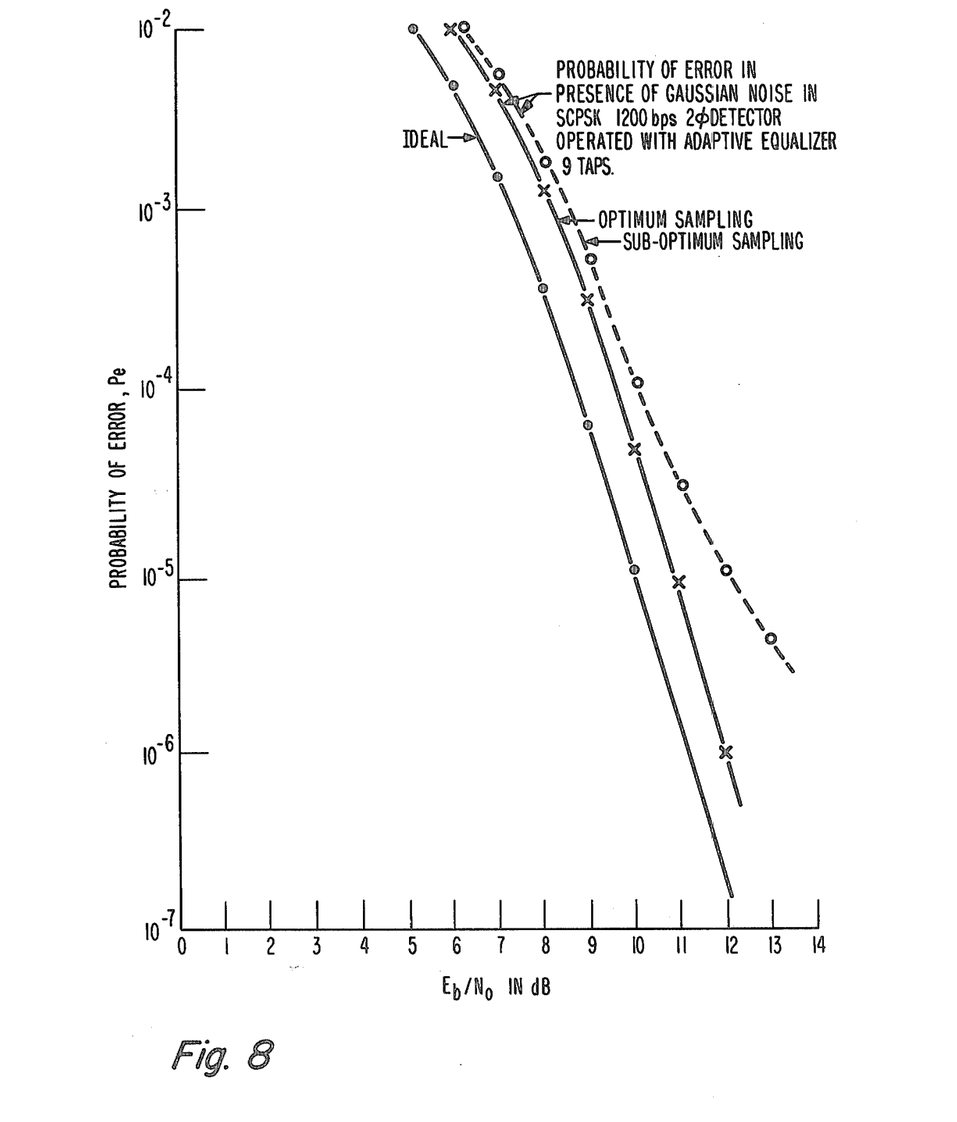
FIG. 8 is a graph showing the probability of error per bit versus the signal-to-noise ratio, energy per bit divided by noise spectrum density, for a single-channel PSK detection system regenerating $f_c$ and $f_k$ and using a symbol synchronizer embodying the present invention, as compared to such a detection system regenerating $f_c$ and $f_k$ but using no symbol synchronizer, and as compared to such a detection system where $f_c$ and $f_k$ are known, free of interfering noise.

FIGS. 7 and 8 show the improved performance obtained through use of the invention in a 1200 baud, single-channel, bi-phase PSK system operated with $f_s$ of 4 kHz and $f_k$ of 1.2 kHz. The symbol synchronizer in this system is of the sort shown in FIG. 1 with the number M of bits resolution in the amplitude of the sawtooth samples equal to 16. FIG. 7 shows the effect on bit error rate of the adjustment, in cycles of $f_k$, of sample time advance for signal-to-noise ratio ($E_b$, energy per bit, divided by $N_0$ spectral noise density) equalling 9 dB, where circuitry 20 simply detects the sign of the sample, and where circuitry 20 includes an equalizer built around a 9-tap delay line. Where sampling time adjustment has to be in multiples of $1/f_s$ seconds, the finest adjustment that can be made in the 1200 Hz keying frequency is 40% of a symbol period. Clearly a much finer adjustment is desired and M=16 bit arithmetic allows an adjustment to fineness of $(40\%)/(2^{16})$ of a symbol period, which is virtually a continuous adjustment. About half an order of BER reduction is provided by symbol synchronizing in accordance with the invention. FIG. 8 shows probability of error per bit for various signal to noise conditions, as compared to that theoretically obtainable, when a nine-tap equalizer is used in decision circuitry 20 for two cases. Firstly, for the case where optimum sampling is provided through use of a symbol synchronizer embodying the invention and, secondly, for the case where sampling is less than optimum owing to the symbol synchronizer having its delay adjusted to closest full cycle of $f_s$.

The present invention makes possible the construction of MPSK detection apparatus with still lower error rates in which the phase correction input to summation circuit 41, rather than having a selected constant value, is automatically adjusted responsive to received MPSK signal conditions. It is then preferable to avoid using the FIG. 2 modification of the FIG. 1 MPSK detection apparatus, so the PLL controlling DCO 30 does not have to restabilize each time it is supplied a new phase correction input. Briefly, such automatic adjustment may be provided as follows. The outputs of resampler 50 define a phasor $v(t) = R(t) + jI(t)$, which is descriptive of keying signal. This phasor is quantized to the nearest ideal keying phase (by suppressing its more significant bits in biphase or quadriphase MPSK), and the difference of the phasor from the phasor describing nearest ideal keying phase is obtained using a subtractor. This difference is low-pass-filtered to obtain the magnitude of the dynamic system phase error. The sense of the phase correction input to DCO 30 resulting in greatest reduction of the dynamic system error can be resolved by dithering between the two possible phase correction inputs until resolution is obtained.

What is claimed is:

1. A digital controlled oscillator operated at a clocking frequency $f_s$, for supplying as output signal a sampled data digital description at $f_s$ rate of a waveform repeating at a repetition rate substantially $f_k$, other signals recited in this claim as being associated with said digital oscillator also being digital sampled data at $f_s$ rate, said oscillator being connected in an automatic phase-lock loop supplied a locking signal, being provided with programmable phase shift of its output signal, and comprising:

means for providing a programmable phase correction signal for said oscillator;

means for supplying on each $f_s$ clock cycle a constant term datum;

delay means for responding to sampled data supplied to an input connection thereof with that sampled data as delayed by a cycle of $f_s$ frequency at an output connection thereof;

first linear combining means for linearly combining, on each $f_s$ clock cycle, the delayed sampled data from the output connection of said delay means, an error signal and said constant term supplied to input connections thereof, a prescribed number of the less significant places of the resulting numbers being supplied at an output connection thereof to the input connection of said delay means as a sampled-data description of phase-locked sawtooth repeating at a repetition rate substantially $f_k$;

second linear combining means for linearly combining, on each $f_s$ clock cycle, said programmable phase correction signal supplied to one input connection thereof and a sampled-data description of phase-locked sawtooth supplied to another input connection thereof from said delay means, said prescribed number of the less significant places of the result being supplied at an output connection thereof providing a sampled-data description of a phase-shifted sawtooth; and error signal generator means for generating at an output connection thereof said error signal responsive to comparison between said locking signal and the sampled data supplied from the output connection of said delay means received at respective input connections of said error signal generator means, phase-shifted output signal from said oscillator being taken from the output connection of said second linear combining means.

2. A digital controlled oscillator operated at a clocking frequency $f_s$, for supplying as output signal a sampled data digital description at $f_s$ rate of a waveform repeating at a repetition rate substantially $f_k$, other signals recited in this claim as being associated with said digital oscillator also being digital sampled data at $f_s$ rate, said oscillator being connected in an automatic phase-lock loop supplied a locking signal, being provided with programmable phase shift of its output signal, and comprising:

means for providing a programmable phase correction signal for said oscillator;

means for supplying on each $f_s$ clocking cycle a constant term datum;

delay means for responding to sampled data supplied to an input connection thereof with that sampled data as delayed by a cycle of $f_s$ frequency at an output connection thereof;

first linear combining means for linearly combining, on each $f_s$ clock cycle, the delayed sampled data from the output connection of said delay means, an error signal and said constant term supplied to input connections thereof, a prescribed number of the less significant places of the resulting numbers being supplied at an output connection thereof to the input connection of said delay means as a sampled-data description of phase-locked sawtooth repeating at repetition rate substantially $f_k$;

second linear combining means for linearly combining, on each $f_s$ clock cycle, said programmable phase correction signal supplied to one input connection thereof and a sampled-data description of phase-locked sawtooth supplied to another input connection thereof from the output connection of said delay means, said prescribed number of the less significant places of the result being supplied at an output connection thereof providing a sampled-data description of a phase-shifted sawtooth; and error signal generator means for generating at an output connection thereof said error signal responsive to comparison between said locking signal and to the sampled data supplied from the output connection of said second linear combining means received at respective input connections of said error signal generator means, phase-shifted output signal from said oscillator being taken from at least one of the connections of said delay means.

3. An oscillator as set forth in claim 1 or 2 in combination with:

means for deriving at $f_s$ rate a succession of complex samples of a band-limited multiple phase shift keying signal with a carrier frequency of $f_c$ selectively phase shifted at $f_k$ keying frequency;

means responsive to the real and imaginary components of each of said succession of complex samples for detecting the amplitude of the envelope of said multiple phase shift keying signal;

a digital filter having an input to which said detected envelope is applied and having an output responsive to the components of said detected envelope at the oscillation frequency of said oscillator for supplying said locking signal;

means responsive to the phase shifted output signal from said oscillator from said second linear combining means for generating a succession of interpolation coefficients; and means for linearly interpolating between successive ones of at least one succession of the real and imaginary components of said complex samples, as a function of said succession of interpolation coefficients, to provide resampling of the multiple phase shift keying signal with improved accuracy of timing.

4. A combination as set forth in claim 3 wherein said means for generating an interpolation coefficient comprises:

means for making determinations of the times of occurrence of the first cycles of $f_s$ following the steep recovery of the phase-shifted sawtooth output signal from said oscillator;

means responsive to each such determination for determining the departure, from one of the extreme values of the phase-shifted sawtooth, of the value of the concurrent sampled datum from such phase-shifted sawtooth; and means scaling the amplitudes of those departures for providing said succession of interpolation coefficients.

* * * * *